United States Patent
Smith, III

(10) Patent No.: US 12,173,824 B2
(45) Date of Patent: Dec. 24, 2024

(54) HYDRAULIC COUPLING WITH DOVETAIL SEAL HAVING MULTIPLE RADIAL SEALING SURFACES AND INNER BIASING ELEMENT

(71) Applicant: National Coupling Company, Inc., Stafford, TX (US)

(72) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 33 days.

(21) Appl. No.: 18/137,319

(22) Filed: Apr. 20, 2023

(65) Prior Publication Data

US 2023/0400100 A1     Dec. 14, 2023

Related U.S. Application Data

(60) Provisional application No. 63/351,128, filed on Jun. 10, 2022.

(51) Int. Cl.
*F16L 37/40*     (2006.01)
*F16J 15/3284*    (2016.01)
*F16L 1/26*      (2006.01)

(52) U.S. Cl.
CPC .......... *F16L 37/40* (2013.01); *F16J 15/3284* (2013.01); *F16L 1/26* (2013.01)

(58) Field of Classification Search
CPC . F16L 37/40; F16L 29/02; F16L 37/32; F16L 29/04; F16L 1/26; F16L 17/025; F16L 17/02; F16L 17/03; F16L 17/06; E21B 33/038; E21B 33/035; E21B 33/0355; E21B 33/0387; F16J 15/3284; F16J 15/3232; F16J 15/3276

See application file for complete search history.

(56) References Cited

U.S. PATENT DOCUMENTS

| | | | |
|---|---|---|---|
| 4,592,558 A * | 6/1986 | Hopkins | F16J 15/3212 277/572 |
| 4,694,859 A | 9/1987 | Smith, III | |
| 4,706,970 A * | 11/1987 | Ramirez | F16J 15/3212 277/556 |
| 4,813,454 A | 3/1989 | Smith, III | |
| 4,884,584 A | 12/1989 | Smith | |
| 4,900,071 A | 2/1990 | Smith, III | |
| 5,015,016 A | 5/1991 | Smith, III | |

(Continued)

OTHER PUBLICATIONS

Office Action in counterpart German Appl. DE 102023113369.1 dated Jan. 26, 2024.

*Primary Examiner* — David Colon-Morales
(74) *Attorney, Agent, or Firm* — Cabello Hall Zinda, PLLC

(57) ABSTRACT

An undersea hydraulic coupling member having a ring-shaped seal with multiple sealing surfaces extending radially inwardly therefrom is disclosed. The multiple sealing surfaces help guide the probe of the male coupling member into the female member without the risk of drag or galling of the receiving chamber or metal seal retained therein. The seal has an interfit with reverse inclined shoulders in the female member to restrain the seal from moving radially inwardly due to vacuum or low pressure. The seal also includes an internal biasing element to restrain the seal from moving radially inwardly during de-mating of the coupling members.

19 Claims, 4 Drawing Sheets

(56) References Cited

U.S. PATENT DOCUMENTS

| | | | | |
|---|---|---|---|---|
| 5,029,613 | A | 7/1991 | Smith, III | |
| 5,052,439 | A | 10/1991 | Smith, III | |
| 5,232,021 | A | 8/1993 | Smith | |
| 5,284,183 | A * | 2/1994 | Smith, III | F16L 37/58 137/614.04 |
| 5,339,861 | A | 8/1994 | Smith, III | |
| 5,355,909 | A * | 10/1994 | Smith, III | F16L 29/04 137/614.04 |
| 5,390,702 | A | 2/1995 | Smith, III | |
| 5,469,887 | A | 11/1995 | Smith, III | |
| 5,979,499 | A | 11/1999 | Smith | |
| 5,983,934 | A | 11/1999 | Smith, III | |
| 6,085,785 | A | 7/2000 | Smith, III | |
| 6,095,191 | A | 8/2000 | Smith, III | |
| 6,179,002 | B1 * | 1/2001 | Smith, III | F16L 29/04 137/614.04 |
| 6,516,831 | B1 | 2/2003 | Smith, III | |
| 6,575,430 | B1 * | 6/2003 | Smith, III | F16L 29/04 251/149.6 |
| 6,923,476 | B2 * | 8/2005 | Smith, III | E21B 33/038 285/108 |
| 6,962,347 | B2 * | 11/2005 | Smith, III | F16L 29/02 137/614.04 |
| 7,021,677 | B2 * | 4/2006 | Smith, III | F16L 1/26 285/379 |
| 7,063,328 | B2 * | 6/2006 | Smith, III | F16L 29/02 137/614.04 |
| 7,159,616 | B2 * | 1/2007 | Watson | F16L 37/40 251/149.6 |
| 7,163,190 | B2 * | 1/2007 | Smith, III | F16L 21/03 251/149.6 |
| 7,303,194 | B2 * | 12/2007 | Smith, III | F16L 17/03 137/614.04 |
| 7,575,256 | B2 * | 8/2009 | Smith, III | F16L 33/16 285/239 |
| 7,913,974 | B2 * | 3/2011 | Smith, III | F16L 1/26 137/614.04 |
| 7,954,859 | B2 * | 6/2011 | Smith, III | F16L 29/02 277/648 |
| 7,976,075 | B2 * | 7/2011 | Smith, III | F16L 17/025 277/618 |
| 8,087,700 | B2 * | 1/2012 | Smith, III | F16L 37/32 251/149.6 |
| 9,016,693 | B1 * | 4/2015 | Shek | F04B 47/00 277/500 |
| 9,145,983 | B2 * | 9/2015 | Smith, III | F16L 37/40 |
| 9,841,130 | B2 * | 12/2017 | Smith, III | F16L 17/032 |
| 10,400,541 | B2 * | 9/2019 | Smith, III | F16J 15/0887 |
| 10,557,577 | B2 | 2/2020 | Smith, III et al. | |
| 11,614,187 | B2 | 3/2023 | Smith, III et al. | |
| 2008/0264503 | A1 | 10/2008 | Smith | |
| 2009/0200793 | A1 | 8/2009 | Smith, III | |
| 2009/0255597 | A1 | 10/2009 | Smith, III et al. | |
| 2009/0273181 | A1 | 11/2009 | Smith, III | |
| 2009/0315276 | A1 | 12/2009 | Smith, III | |
| 2010/0244431 | A1 | 9/2010 | Smith, III | |
| 2011/0037249 | A1 | 2/2011 | Smith III | |
| 2011/0101675 | A1 * | 5/2011 | Smith, III | F16L 25/01 285/119 |
| 2011/0248497 | A1 * | 10/2011 | Smith, III | F16L 1/26 277/627 |
| 2014/0203516 | A1 * | 7/2014 | Kocurek | F16J 15/166 277/399 |
| 2020/0332621 | A1 * | 10/2020 | Smith, III | F16L 17/03 |

* cited by examiner

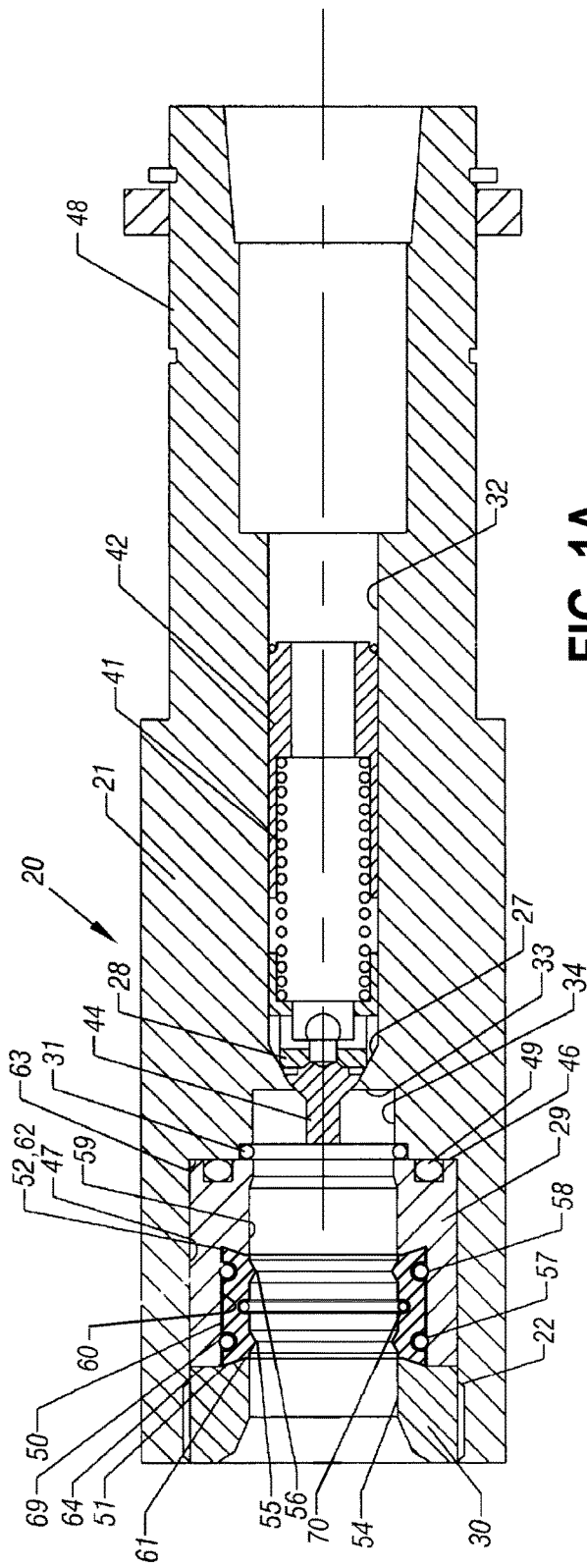
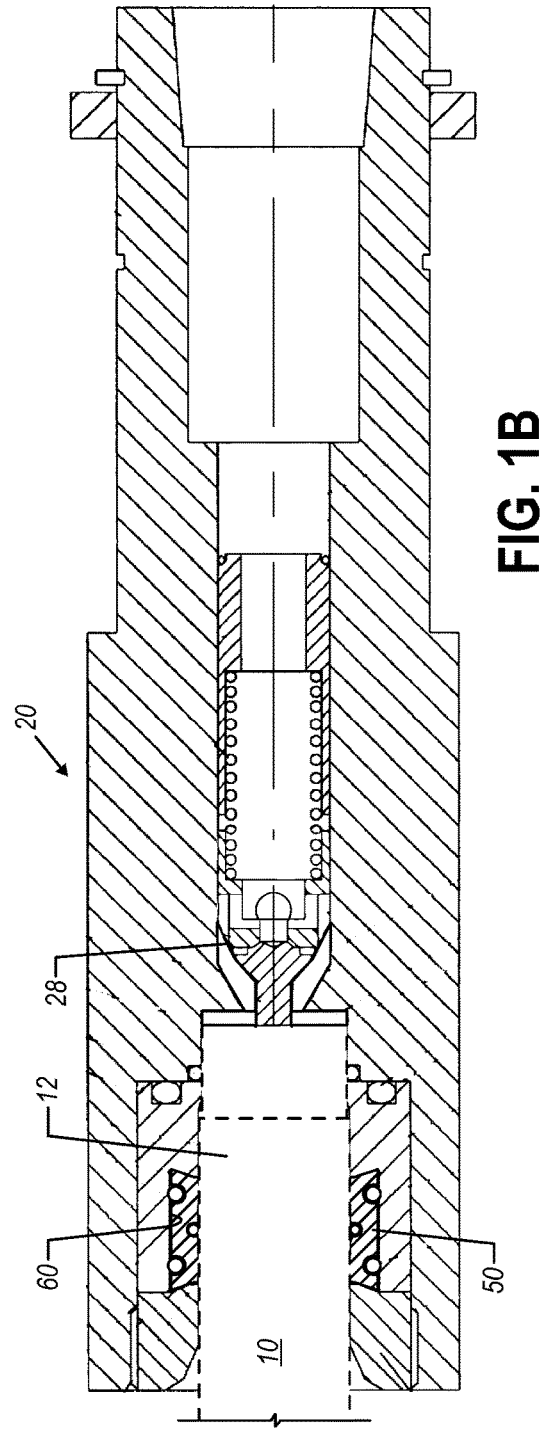
FIG. 1A
FIG. 1B

HYDRAULIC COUPLING WITH DOVETAIL SEAL HAVING MULTIPLE RADIAL SEALING SURFACES AND INNER BIASING ELEMENT

CROSS-REFERENCE TO RELATED APPLICATIONS

This application claims the benefit of U.S. Provisional Application No. 63/351,128 filed on Jun. 10, 2022, which is incorporated herein by reference in its entirety.

FIELD OF THE DISCLOSURE

The subject matter of the present disclosure relates, in general, to hydraulic couplings, and specifically to hydraulic couplings used in undersea drilling and production applications. More particularly, the disclosed subject matter relates to an undersea hydraulic coupling having an improved radial seal with a dovetail interfit with the female member of a coupling for holding and positioning the seal in place.

BACKGROUND OF THE DISCLOSURE

Subsea hydraulic couplings are old in the art. The couplings have a male member and a female member with seals that are used to seal the junction between the male and female members. The female member has a cylindrical body with a large diameter bore at one end and a small diameter bore at the other. The small bore facilitates connections to hydraulic lines, while the large bore contains the seals and receives the male portion of the coupling. The male member includes a probe section insertable into the large bore of the female member. The seals either abut the end, or face, of the male member or engage the male member about its outer circumference. Hydraulic fluid is then free to flow through the female and male portions of the coupling and seals prevent that flow from escaping about the joints of the coupling.

Operators continually seek to improve undersea hydraulic couplings that have improved sealing functionality and can reduce drag or galling when the male member enters the female member of a coupling.

The subject matter of the present disclosure is directed to overcoming, or at least reducing the effects of, one or more of the problems set forth above.

SUMMARY OF THE DISCLOSURE

A female member is used for coupling with a probe of a corresponding male member to communicate fluid having fluid pressure. The probe has an external surface. The female member comprises a body, a tubular seal, and a biasing element.

The body defines a bore in which the probe is at least partially insertable. The bore defines a recess, which has a cylindrical sidewall separated by first inclined shoulders. The first inclined shoulders are inclined toward one another at the bore of the body.

The tubular seal is disposed in the recess of the body and defines a through-bore therein between ends. The seal has an outer surface configured to position against the cylindrical sidewall of the recess. The through-bore has an inner surface configured to position against the external surface of the probe inserted therein. The outer surface has a pair of outer sealing members disposed circumferentially thereabout. The outer sealing members are configured to seal with the cylindrical sidewall of the recess. The ends have second inclined shoulders being inclined toward one another at the through-bore of the tubular seal. The second inclined shoulders are configured to position against the first inclined shoulders of the body.

The biasing element is disposed circumferentially about the inner surface of the tubular seal. The biasing element is configured to circumferentially bias a portion of the outer surface of the tubular seal toward the cylindrical sidewall of the recess. The biased portion being situated between the pair of outer sealing members.

A female member is disclosed herein for coupling with a probe of a corresponding male member to communicate fluid having fluid pressure. The female member has a body, a valve, a tubular seal, and a biasing element. The body defines a bore in which the probe is at least partially insertable. The bore defines a recess, which has a cylindrical sidewall separated by first inclined shoulders. The first inclined shoulders are inclined toward one another at the bore of the body. The valve is disposed in the bore of the body and is configured to control fluid flow through the bore.

The tubular seal is disposed in the recess of the body and defines a through-bore therein between ends. The seal has an outer surface, which defines external grooves disposed circumferentially thereabout. The through-bore has an inner surface, which defines an inner groove disposed circumferential thereabout between the external grooves. The ends have second inclined shoulders that are inclined toward one another at the through-bore of the cylindrical seal. The second inclined shoulders are configured to fit adjacent to the first inclined shoulders of the body. The outer surface is configured to fit adjacent the cylindrical sidewall of the recess;

A pair of outer seal rings are disposed in the external grooves defined in the outer surface of the cylindrical seal. The outer seal rings are configured to seal with the cylindrical sidewall of the recess. The biasing element is a spring ring disposed in the inner groove. The spring ring is configured to circumferentially bias a portion the outer surface of the cylindrical seal toward the cylindrical sidewall of the recess, where the biased portion is situated between the pair of outer seals.

A coupling disclosed herein can comprises a male member and a female member. The male member has a probe to communicate fluid having fluid pressure, the probe having an external surface. The female member can have the features as described above.

The foregoing summary is not intended to summarize each potential embodiment or every aspect of the present disclosure.

BRIEF DESCRIPTION OF THE DRAWINGS

FIG. 1A illustrates a cross-sectional view of a female member of a coupling according to the present disclosure.

FIG. 1B illustrates a schematic view of a male member of the coupling mated with the female member according to the present disclosure.

DETAILED DESCRIPTION OF THE DISCLOSURE

Undersea hydraulic couplings are connected to opposing plates of a manifold and are held together by bolts or hydraulic members attached to the plates. The male and female members may be attached to the opposing plates using various means, such as set screws or threads. Techniques for attaching members to such plates are well known to those skilled in the art.

Figure 2:
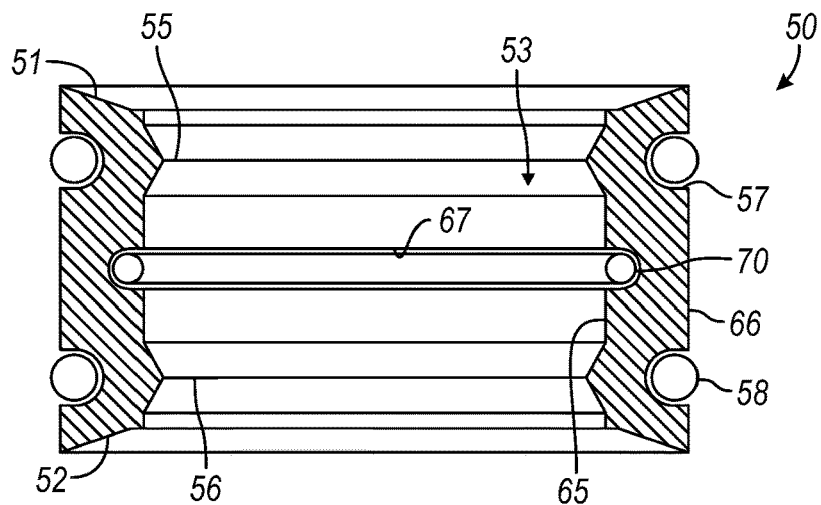
FIGS. 2, 3, 4, 5, 6 and 7 illustrate cross-sectional view of a tubular dovetail seal having arrangements of radial sealing surfaces and inner biasing rings according to the present disclosure.

FIG. 1A illustrates a cross-sectional view of a female member 20 of a coupling according to the present disclosure. Meanwhile, FIG. 1B illustrates a schematic view of a male member or probe 10 of the coupling being mated with the female member 20 according to the present disclosure. The probe 10 is insertable into the female member 20, and the probe 10 has an external surface for sealing with features inside the female member 20. Finally, FIG. 2 illustrates an example of a tubular seal 50 of the present disclosure for use in the female member 20.

In general, the female member 20 disclosed here can be used for coupling with a probe 12 of a corresponding male member 10 to communicate fluid having fluid pressure. The female member 20 includes a body 21, a valve 28, a tubular seal and a biasing element 70. The body 21 defines a bore 32 in which the probe 12 of the male member 10 is at least partially insertable. The valve 28 is disposed in bore 32 of the body 21 and is configured to control fluid flow through the bore 32.

The bore 32 defines a recess 60, which has a cylindrical sidewall separated by inclined shoulders 62, 64. The inclined shoulders 62, 64 are inclined toward one another at the bore 32 of the body 21. The tubular seal 50 is disposed in the recess of the body 21 and defines a through-bore 53 therein between ends 51, 52. The seal 50 has an outer surface 66 configured to position against the cylindrical sidewall of the recess 60. The through-bore 53 has an inner surface 65 configured to position against the external surface of the probe 12 inserted therein. The outer surface 66 has a pair of outer sealing members 58 disposed circumferentially thereabout. The outer sealing members 58 are configured to seal with the cylindrical sidewall of the recess 60. The ends of the seal 50 have second inclined shoulders 51, 52 being inclined toward one another at the through-bore 53 of the tubular seal 50. These inclined shoulders 51, 52 being configure to position against the inclined shoulders 61, 62 of the body 21.

The biasing element 70 is disposed circumferentially about the inner surface of the tubular seal 50. The biasing element 70 is configured to circumferentially bias a portion the outer surface 66 of the tubular seal 50 toward the cylindrical sidewall of the recess 60, where the biased portion is situated between the pair of outer sealing members 58.

As shown in FIG. 1A, a handle 48 of the body 21 may be threaded to a manifold plate (not shown). The central bore 32 of the body 21 has several variations in its diameter as it extends through the female member 20. The first end of the bore 32 may be internally threaded for connection to a hydraulic line (not shown). A cylindrical passageway of the bore 32 extends longitudinally within the female member 20 and terminates at a valve seat 27. Adjacent the valve seat 27 is a shoulder 33 that forms one end of a receiving chamber 34.

The receiving chamber 34 receives the probe (12) of the male member (10; FIG. 1B). The probe 12 is cylindrical and is inserted into the female member 20. The receiving chamber 34 has a stepped internal diameter with internal shoulders 33, 35, and 63, and the receiving chamber 34 has a first smaller diameter and a second larger diameter 47.

The female member 20 may optionally include the flow valve, such as a poppet valve 28 slidably received within the cylindrical passageway of the bore 32. The poppet valve 28 is conical in shape and is urged by a valve spring 41 into a seated position against the valve seat 27. When the poppet valve 28 is in a closed position against the valve seat 27, the poppet valve 28 seals fluid from flowing between the male member (10) and the female member 20. A hollow spring collar 42 anchors the valve spring 41 and is held in place by a collar clip. An actuator 44 extends from the apex of the poppet valve 28 for engagement with a portion of the probe (12) of the male member (10) inserted in the female member 20.

The ring-shaped, tubular seal 50 is positioned in the receiving chamber 34 of the female member 20 to seal with the probe 12 of the male member 10. The tubular seal 50 is an elastomer or polymer seal that is flexible and resilient. As best shown in FIG. 2, the tubular seal 50 has a first inclined shoulder surface 52 and a second inclined shoulder surface 51. The axial thickness of the elastomeric tubular seal 50 at outer circumference 66 is greater than the axial thickness of the seal 50 at inner circumference 65. The tubular seal 50 has a wedge-shaped cross-section.

The tubular seal 50 has at least two radial sealing surfaces 55, 56 extending inwardly from the seal's inner circumference or surface 65 of the seal's through-bore or passage 53. Each of the radial sealing surfaces 55, 56 extends radially inwardly from the inner circumference 65 to engage the probe 12 of the male member (10) when the probe 12 is inserted through the seal 50. Each of the radial sealing surfaces 55, 56 is elastically deformed by the probe 12 when it is inserted through the seal 50. The two radial sealing surfaces 55, 56 provide guide points to help align and guide the probe 12 when it is inserted through the seal 50 into the receiving chamber 34. The pair of radial sealing surfaces 55, 56 reduces or eliminates the problem and resulting damage from drag against the female bore and/or galling of the coupling surfaces and seal surfaces.

Additionally, the tubular seal 50 has grooves 57 in its outer circumference or surface 66, and radial sealing members 58 in the form of O-ring seals are positioned in each of the grooves 57. Alternatively, and as discussed further below with reference to FIG. 5 and the like, instead of grooves 57 and O-ring seals 58, the seal 50 may have a plurality of integral projections (not shown) for the sealing members, which extend radially outwardly from the outer circumference 66.

In the embodiment of FIGS. 1A-1B, the tubular seal 50 is restricted from being imploded into the receiving chamber 34 due to low pressure or vacuum because the seal 50 has an interfit with a reverse inclined shoulder surface 62 of a first seal retainer or cartridge 29 and a reverse inclined shoulder surface 61 of a second seal retainer or locking member 30. The cartridge 29 may be a cylindrical sleeve that slides into the second diameter 47 of the receiving chamber 34. Alternatively, the cartridge 29 may be threaded to the female member 20 or engaged to the female member 20 by other means. Preferably, when the cartridge 29 is fully engaged with the female member 20, a first end 46 of the cartridge 29 abuts the shoulder 63. The cartridge 29 holds one or more hollow radial metal seals 31 on an internal shoulder 35.

These metal seals 31 can be pressure-energized metal C-seals and can have features such as disclosed in U.S. Pat. Nos. 10,400,541 and 11,614,187, which are incorporated herein by reference.

The cartridge 29 has a first internal circumferential surface 59 adjacent to the first end thereof and a second internal circumferential surface 69 adjacent the second end thereof. The internal diameter of the first inner circumferential surface 59 is smaller than the internal diameter of the second internal circumferential surface 69. Reverse inclined shoulder 62 is between the first and second internal circumferential surfaces 59, 69. The reverse inclined shoulder 62 has an interfit with the tubular seal 50 to restrain the tubular seal 50 from moving radially inwardly. An O-ring seal 49 can be positioned in a groove at the first end 46 of the cartridge 29 to provide a face-type seal between the cartridge 29 and shoulder 63.

The seal retainer 30 engages the female member 20 using threads 22 or other means. When the seal retainer 30 is fully secured to the female member 20, a first end 64 abuts the cartridge 29 and holds the cartridge 29 in place. The seal retainer 30 has an internal diameter 54 that allows insertion of the probe 12 of the male member (10) therethrough. Reverse inclined shoulder surface 61 holds seal 50 in place and restrains the tubular seal 50 from moving radially inwardly.

In addition to the interfit having reverse inclined shoulder surfaces 62, 61 of the cartridge 29 and seal retainer 30, the tubular seal 50 is restricted from being imploded into the receiving chamber 34 due to low pressure or vacuum because the seal 50 has an internal biasing element 70 disposed in the inner diameter 65 of the seal 50. As shown in FIGS. 1A and 2, the internal biasing element 70 can be a round spring ring, which can be composed of a metal material although other materials can be used. The spring ring 70 can be disposed in an annular groove 67 defined circumferentially in the inner diameter 65 of the seal 50. If feasible during manufacture and as discussed below with reference to FIG. 6, the spring ring 70 can be at least partially molded into the material of the seal 50. The spring ring 70 can help prevent the implosion of the elastomeric seal 50 when the male and female members 10, 20 of the coupling are de-mated from one another. In deep water applications, for example, the hydrostatic head could cause a soft elastomeric seal to implode upon de-mating of the couplings' members. In this case, the spring ring 70 can counteract this tendency for the disclosed tubular seal 50.

The tubular seal 50 can be lengthened so that it may be used with a longer probe 12 of the male member 10. The seal length is based on the length of the probe and/or the depth of the female receiving chamber 34. Greater spacing of the radial sealing surfaces 55, 56 can also help align the male and female members 10, 20 of the coupling and avoid damage to the metal seal 31 in the coupling.

Figure 3:
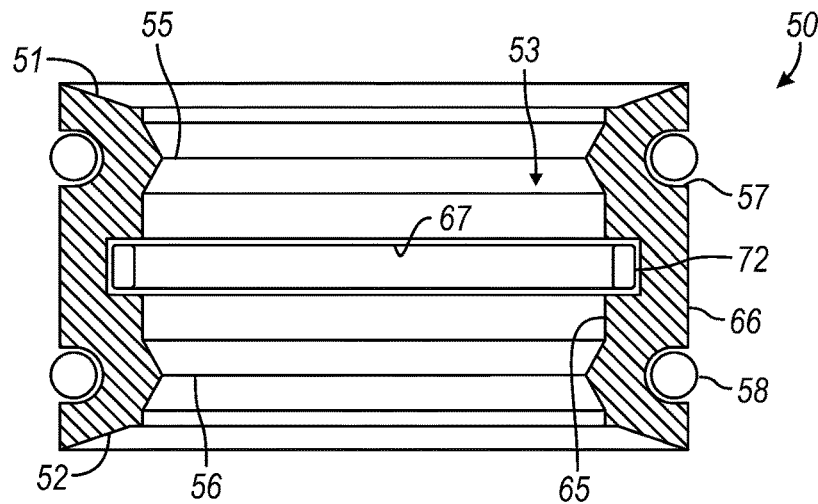

FIG. 3 illustrates a cross-sectional view of another dovetail tubular seal 50 with multiple radial sealing surfaces 55, 56 according to the present disclosure. Features of this tubular seal 50 are similar to those disclosed above with reference to FIGS. 1A-1B and 2. Thus, the tubular seal 50 provides an interfit of its inclined surfaces 51, 52 to engage reverse inclined shoulder surfaces (62, 61) of seal retainer (29) and locking member (30).

Additionally, the tubular seal 50 of FIG. 3 can be restricted from being imploded into the receiving chamber 34 due to low pressure or vacuum because the seal 50 has an internal biasing element 72 disposed in the inner diameter 65 of the seal 50. As shown here, the internal biasing element 72 can be a flat spring band, which can be composed of metal although other materials can be used. The spring band 72 can be disposed in an annular groove 67 in the inner diameter 65 of the seal 50. If feasible during manufacture and as discussed below with reference to FIG. 7, the spring band 72 can be at least partially molded into the material of the seal 50. The spring band 72 can help prevent the implosion of the elastomeric seal when the male and female members 10, 20 of the coupling are de-mated from one another. In deep water applications, the hydrostatic head could cause a soft elastomeric seal to implode upon de-mating of the couplings' members. In this case, the spring band 72 can counteract this for the disclosed seal 50.

Figure 4:
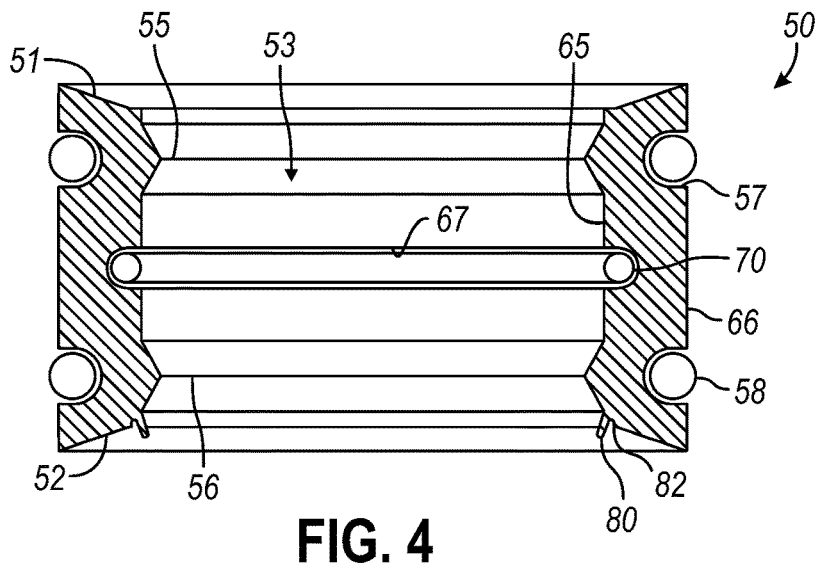

FIG. 4 illustrates a cross-sectional view of yet another dovetail tubular seal according to the present disclosure. This seal 50 has similar features to those disclosed above. For example, the tubular seal 50 has inclined shoulders 51, 52 and has radial sealing surfaces 55, 56 on the inner diameter 65. Additionally, this seal 50 includes a third radial sealing surface 80, in addition to radial sealing surfaces 55, 56. This radial sealing surface 80 tends to project radially inwardly from inner circumference 65. In this embodiment, the third radial sealing surface 80 may be pressure energized by hydraulic fluid pressure in the coupling to enhance the radial sealing with the probe 12 of the male member 10 of the coupling. As hydraulic fluid at high pressure enters a cavity 82 formed by the sealing surface 80, the surface 80 is urged radially inwardly against the probe 12.

Figure 5:
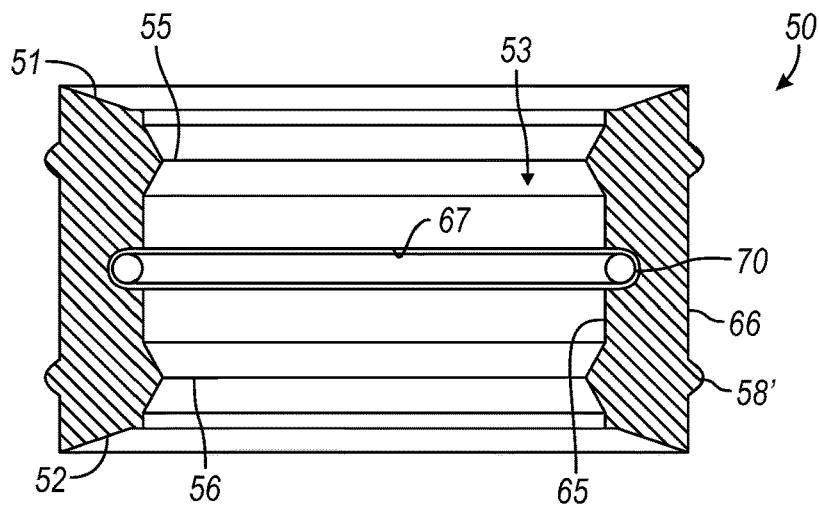

FIG. 5 illustrates a cross-sectional view of yet another dovetail tubular seal 50. As shown, the seal 50 includes the first type of internal biasing element in the form of the spring ring 70 disposed in an internal annular groove 67, but a flat spring band (72) can be used. As opposed to using O-ring seals 58 in external grooves 57 in the outer surface 66 for outer sealing members as in other arrangements, the tubular seal 50 of FIG. 5 includes outer sealing members 58' that are integrally formed on the outer surface 66 of the tubular seal 50. These outer sealing members 58' extend beyond the outer circumference of the surface and can perform the same function as the O-ring seals 58 described previously.

Figure 6:
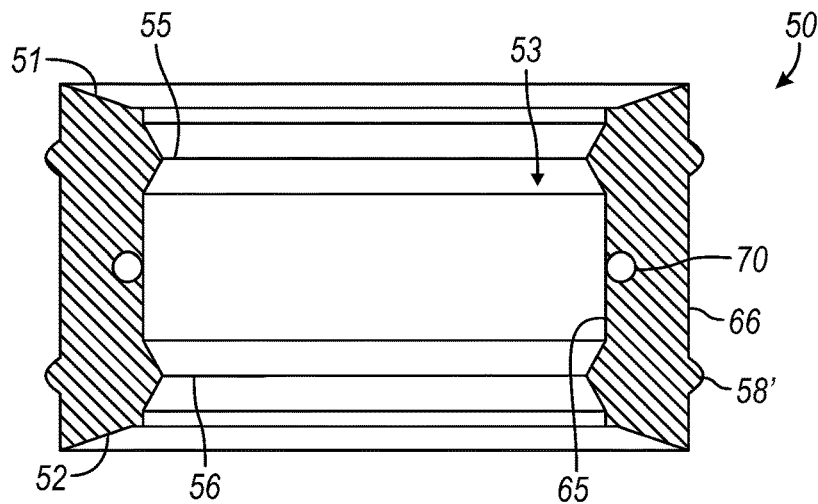

FIG. 6 illustrates a cross-sectional view of yet another dovetail tubular seal 50. As shown, the tubular seal 50 includes the integral outer sealing members 58', but the seal 50 could include O-ring seals in external grooves as in other embodiments. As opposed to having the spring ring 70 disposed in an inner groove of the seal's through-bore 53, the tubular seal 50 of FIG. 6 has the spring ring 70 at least partially molded into the elastomeric material of the tubular seal 50.

Figure 7:
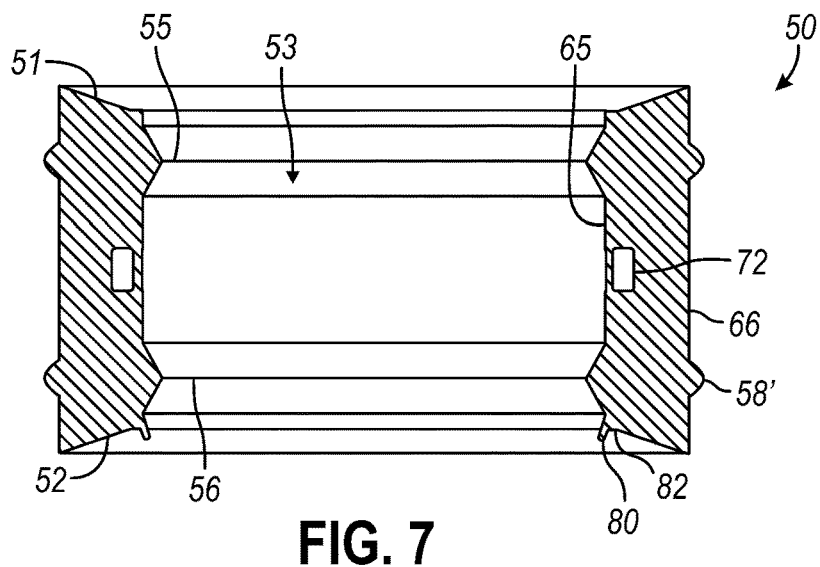

FIG. 7 illustrates a cross-sectional view of yet another dovetail tubular seal which includes a combination of the previous features. As shown, the flat spring band 72 can be at least partially molded into the elastomeric material of the tubular seal 50, and outer sealing members 58' can be integrally formed on the outer surface 66 of the tubular seal 50. Finally, a cavity 82 can be formed by an additional sealing surface 80 on an inner edge of the seal's through-bore 53. As FIGS. 2 through 7 show, the various features disclosed herein can be combined in different combinations for the tubular seal 50 of the present disclosure.

Figure 8:
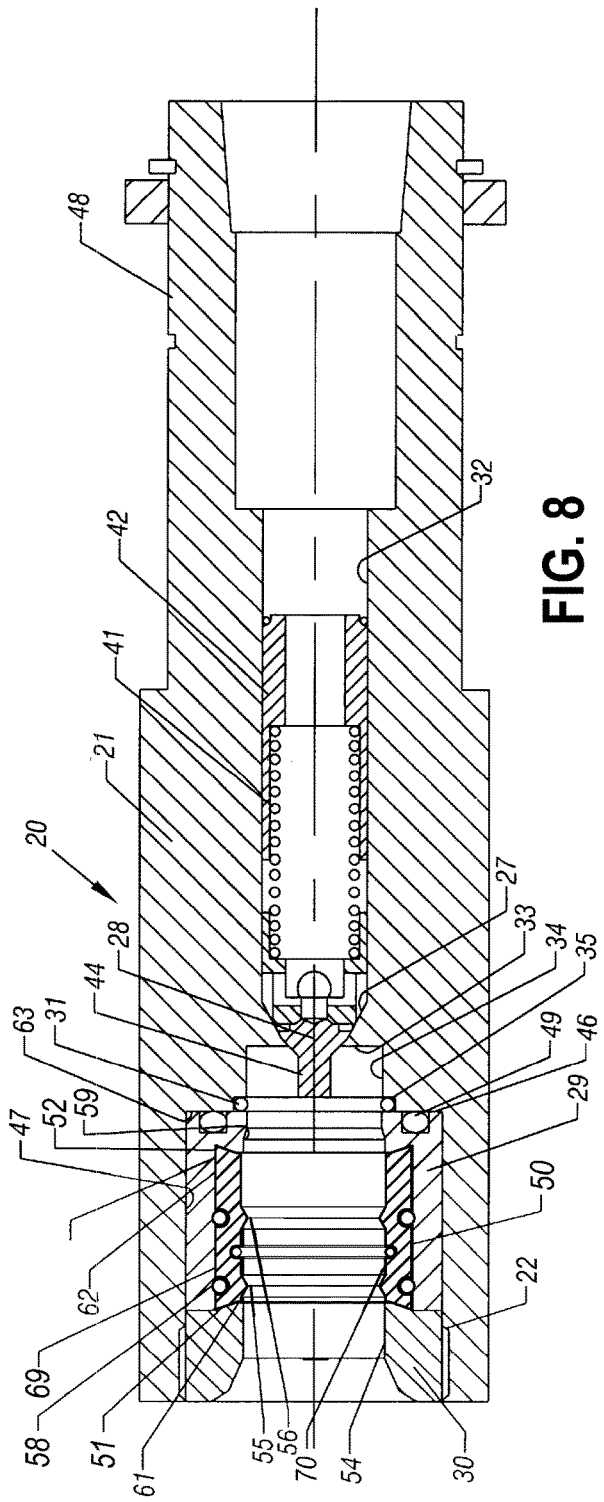
FIG. 8 illustrates a cross-sectional view of another female member of a coupling according to the present disclosure.

FIG. 8 illustrates a cross-sectional view of another female member 20 of a coupling having another tubular seal 50 according to the present disclosure. Features of the female member 20 and the tubular seal 50 are similar to those disclosed above. As shown here, the tubular seal 50 has a longer length between its radial sealing surfaces 55, 56 to accommodate a male member (10) having a lengthened probe section. For example, one end of the seal 50 can include an extended section 84. Accordingly, in previous examples, the biasing element 70 is disposed centrally in the through-bore 53 between the ends of the tubular seal 50. In the present example, the biasing element 70 is disposed offset in the through-bore 53 toward one the ends of the tubular seal 50.

Additional embodiments of the arrangement in FIG. 8 can use any of the other tubular seals 50 and features disclosed herein, such as in FIGS. 2 through 7.

Figure 9:
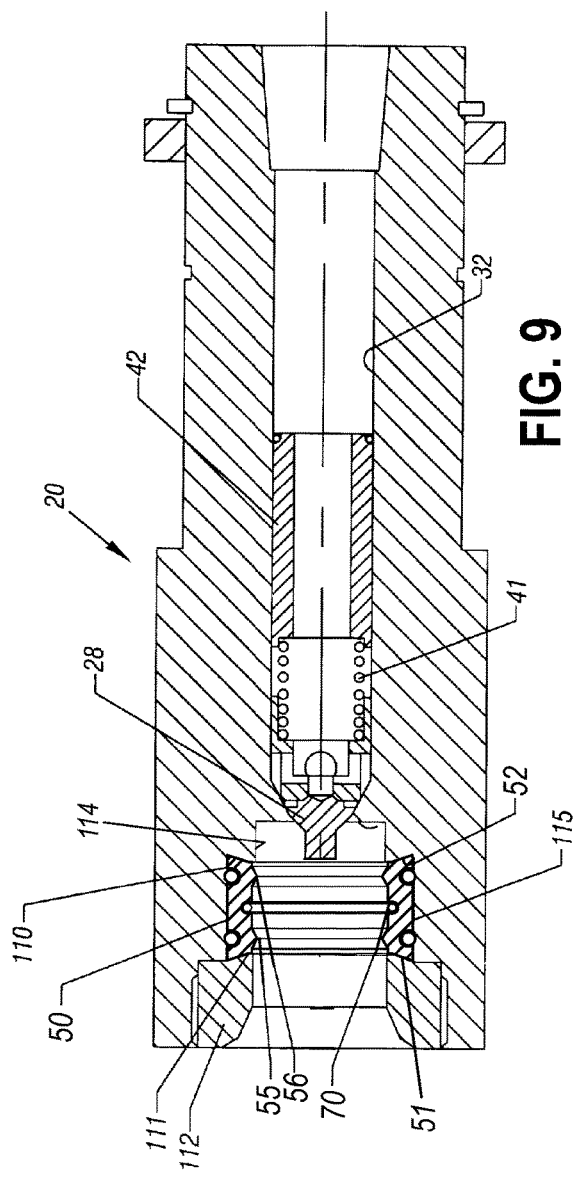
FIG. 9 illustrates a cross-sectional view of yet another female member of a coupling according to the present disclosure.

FIG. 9 illustrates a cross-sectional view of yet another female member 20 of a coupling having a tubular seal 50 according to the present disclosure. In this embodiment, a separate retainer (29) and radial seal (31) from other configurations are not used. Instead, a reverse inclined shoulder 110 is formed between the smaller and larger diameters 114, 115 of the receiving chamber 34. Accordingly, the tubular seal 50 has an interfit between the seal's inclined surface 52 and reverse inclined shoulder 110 in the wall of the female member's receiving chamber 34 and between the seal's other inclined surface 51 and reverse inclined shoulder 111 on externally threaded locking member 112. Thus, the seal 50 disclosed herein may be used in a female member 20 with or without a radial metal seal (31) and seal retainer (29) used in other configurations.

Additional embodiments of the arrangement in FIG. 9 can use any of the other tubular seals 50 and features disclosed herein, such as in FIGS. 2 through 8.

The coupling and sealing of the present disclosure provide multiple radial sealing surfaces between the male and female members 10, 20 of a coupling without additional seal retainers or other components. The redundant sealing surfaces help guide the probe 12 of the male member 10 into the female member 20 and reduce the risk of galling. The present disclosure also contemplates that at least one of the radial sealing surfaces may be pressure energized. The seal 50 having multiple radial sealing surfaces is restrained from radial movement toward the central axis or bore 32 of the female member 20, so the male and female members 10, 20 may be separated without risk of blowing out the seal 50. Other advantages of the present configurations include the reusable nature of the seal 50. In particular, the seal 50 can be used to retrofit existing coupling members and seal retainers, and the seal can be used as a replacement in couplings having different seal configurations.

This tubular seal 50 may be made of any elastomer or polymer that is flexible and resilient, and that can withstand the deteriorating effect of the subsea environment. The seal 50 may be made of a pliable elastomeric or polymer material, for example, rubber or synthetic elastomer. The tubular seals 50 of this disclosure are reusable because they are retained in place upon separation of the male member (10) and female member 20 of the coupling. Additional details of the tubular seal 50 and female member 20 disclosed herein can be found in U.S. Pat. No. 6,575,430 issued Jun. 10, 2003, which is incorporated herein by reference in its entirety.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A female member for coupling with a probe of a corresponding male member to communicate fluid having fluid pressure, the probe having an external surface, the female member comprising:
 a body defining a bore in which the probe is at least partially insertable, the bore defining a recess, the recess having a cylindrical sidewall separated by first inclined shoulders, the first inclined shoulders being inclined toward one another at the bore of the body;
 a tubular seal disposed in the recess of the body and defining a through-bore therein between ends, the tubular seal having an outer surface configured to position against the cylindrical sidewall of the recess, the through-bore having an inner surface configured to position against the external surface of the probe inserted therein, the outer surface having a pair of outer sealing members disposed circumferentially thereabout, the outer sealing members being configured to seal with the cylindrical sidewall of the recess, the ends having second inclined shoulders being inclined toward one another at the through-bore of the tubular seal, the second inclined shoulders being configured to position against the first inclined shoulders of the body; and
 a biasing element disposed circumferentially about the inner surface of the tubular seal, the biasing element being configured to circumferentially bias a portion of the outer surface of the tubular seal toward the cylindrical sidewall of the recess, the portion being situated between the pair of outer sealing members.

2. The female member of claim 1, wherein the inner surface defines an inner groove circumferentially thereabout between the outer sealing members; and wherein the biasing element is disposed in the inner groove.

3. The female member of claim 1, wherein the biasing element comprises: a round spring ring; a flat spring band, a ring composed of a metal material; or a band composed of a metal material.

4. The female member of claim 1, wherein the biasing element is at least partially molded into an elastomeric material of the tubular seal.

5. The female member of claim 1, wherein the biasing element is configured to prevent implosion of the tubular seal when the probe is removed from the female member.

6. The female member of claim 1, wherein the inner surface defines radial sealing surfaces extending from the inner surface inward into the through-bore.

7. The female member of claim 6, wherein the radial sealing surfaces are disposed concentric to the outer sealing members.

8. The female member of claim 6, wherein the radial sealing surfaces are configured to elastically deform when the probe is inserted through the through-bore of the tubular seal.

9. The female member of claim 1, wherein the biasing element is disposed centrally in the through-bore between the ends of the tubular seal.

10. The female member of claim 1, wherein the biasing element is disposed offset in the through-bore toward one the ends of the tubular seal.

11. The female member of claim 1, wherein one of the ends of the tubular seal comprises a radial sealing surface projecting radially inwardly from an inner circumferential edge on the end.

12. The female member of claim 1, wherein the tubular seal has a wedge-shaped cross section; and wherein the second inclined shoulders have a dovetail interfit with the first inclined shoulders of the recess.

13. The female member of claim 1, wherein the outer surface of the tubular seal has a plurality of radial grooves defined circumferentially therein; and wherein each of the outer sealing members comprises an O-ring seal positioned in each radial groove.

14. The female member of claim 1, wherein the body comprises:
a housing defining one portion of the bore, the housing having one of the first inclined shoulders and having the cylindrical sidewall of the recess; and
a retainer disposed in the housing, the retainer having a central passage and an edge, the central passage defining another portion of the bore, the edge of the retainer forming the other first inclined shoulder of the recess.

15. The female member of claim 1, wherein the body comprises:
a housing defining one portion of the bore;
a cartridge disposed in the housing, the cartridge having one of the first inclined shoulders and having the cylindrical sidewall of the recess; and
a retainer disposed in the housing, the retainer having a central passage and an edge, the central passage defining another portion of the bore, the edge of the retainer forming the other first inclined shoulder of the recess.

16. The female member of claim 15, further comprising at least one of:
an exposed seal retained between the cartridge and the housing, the exposed seal exposed in the bore and being configured to seal with the external surface of the probe insertable therein;
an internal seal being sealably engaged between the cartridge and the housing; and
an O-ring face seal disposed in an annular groove defined in an edge of the cartridge and being sealably engaged with the housing adjacent to the edge.

17. The female member of claim 1, wherein the bore of the body comprises a valve seat defined in the bore; and wherein the female member comprises a poppet valve disposed in the bore of the body, the poppet valve being displaceable relative to the valve seat by the probe inserted in the bore of the body and being configured to control fluid flow through the bore.

18. A coupling, comprising: the male member having the probe to communicate fluid having fluid pressure, the probe having the external surface; and
the female member for coupling with the probe of the male member to communicate the fluid having the fluid pressure, the female member comprising:
a body defining a bore in which the probe is at least partially insertable, the bore defining a recess, the recess having a cylindrical sidewall separated by first inclined shoulders, the first inclined shoulders being inclined toward one another at the bore of the body;
a tubular seal disposed in the recess of the body and defining a through- bore therein between ends, the tubular seal having an outer surface configured to position against the cylindrical sidewall of the recess, the through-bore having an inner surface configured to position against the external surface of the probe inserted therein, the outer surface having a pair of outer sealing members disposed circumferentially thereabout, the outer sealing members being configured to seal with the cylindrical sidewall of the recess, the ends having second inclined shoulders being inclined toward one another at the through-bore of the tubular seal, the second inclined shoulders being configured to position against the first inclined shoulders of the body; and
a biasing element disposed circumferentially about the inner surface of the tubular seal, the biasing element being configured to circumferentially bias a portion of the outer surface of the tubular seal toward the cylindrical sidewall of the recess, the portion being situated between the pair of outer sealing members.

19. A female member for coupling with a probe of a corresponding male member to communicate fluid having fluid pressure, the probe having an external surface, the female member comprising:
a body defining a bore in which the probe is at least partially insertable, the bore defining a recess, the recess having a cylindrical sidewall separated by first inclined shoulders, the first inclined shoulders being inclined toward one another at the bore of the body;
a valve disposed in bore of the body and being configured to control fluid flow through the bore;
a tubular seal disposed in the recess of the body and defining a through-bore therein between ends, the tubular seal having an outer surface, the outer surface defining external grooves disposed circumferentially thereabout, the through-bore having an inner surface, the inner surface defining an inner groove disposed circumferential thereabout between the external grooves, the ends having second inclined shoulders being inclined toward one another at the through-bore of the tubular seal, the second inclined shoulders being configured to fit adjacent the first inclined shoulders of the body, the outer surface being configured to fit adjacent the cylindrical sidewall of the recess;
a pair of outer seal rings disposed in the external grooves defined in the outer surface of the tubular seal, the outer seal rings being configured to seal with the cylindrical sidewall of the recess; and
a spring ring disposed in the inner groove, the spring ring being configured to circumferentially bias a portion of the outer surface of the tubular seal toward the cylindrical sidewall of the recess, the portion being situated between the pair of outer seals.

* * * * *